June 12, 1962 C. H. FRITZ ETAL 3,038,172
FOOD WASTE REMOVAL APPARATUS
Filed May 26, 1959 2 Sheets-Sheet 1

INVENTORS
CHARLES H. FRITZ
GEORGE A. MARTINEK

BY THEIR ATTORNEYS
HARRIS, KIECH, RUSSELL & KERN

June 12, 1962  C. H. FRITZ ET AL  3,038,172
FOOD WASTE REMOVAL APPARATUS
Filed May 26, 1959
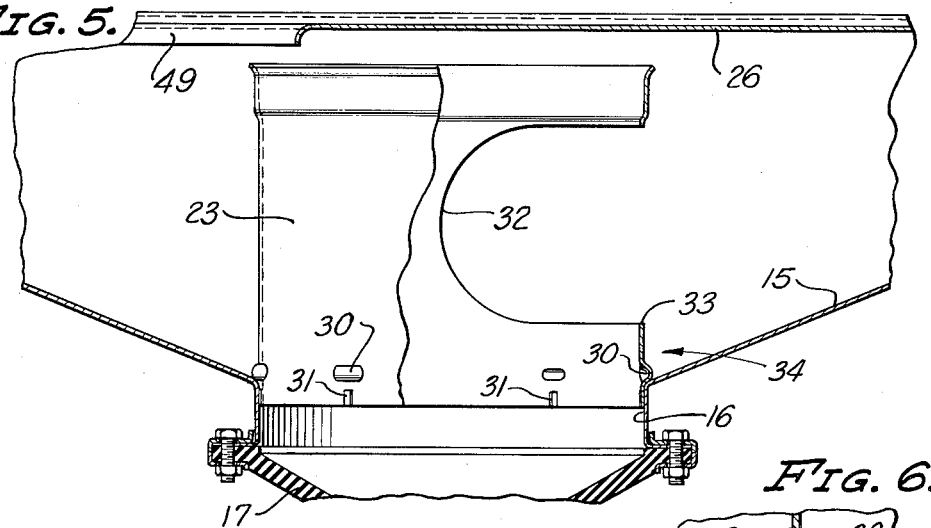
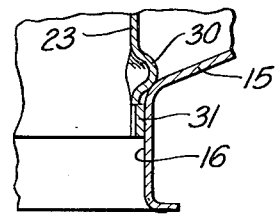
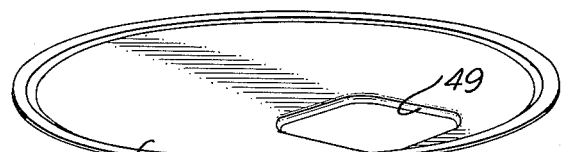
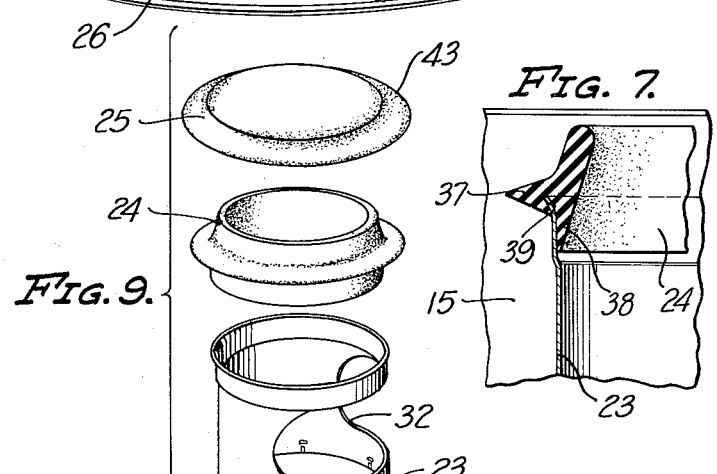
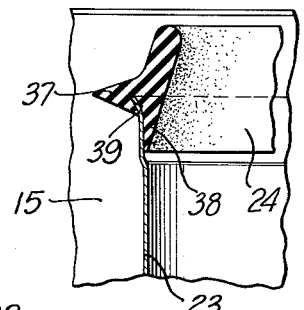
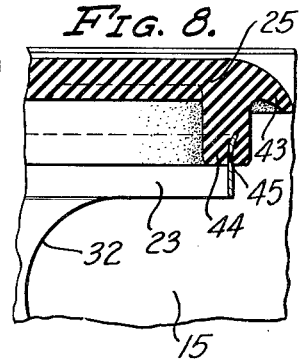
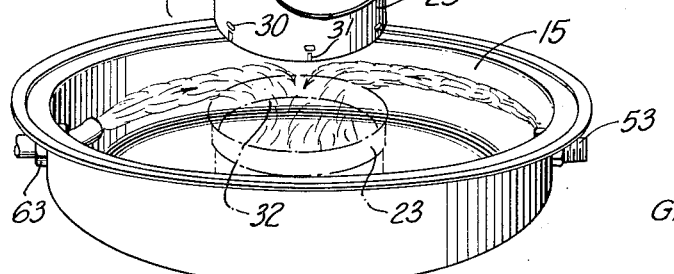
INVENTORS
CHARLES H. FRITZ
GEORGE A. MARTINEK
BY THEIR ATTORNEYS
HARRIS, KIECH, RUSSELL & KERN

United States Patent Office 3,038,172
Patented June 12, 1962

3,038,172
FOOD WASTE REMOVAL APPARATUS
Charles H. Fritz, Long Beach, and George A. Martinek, Pasadena, Calif., assignors to Waste King Corporation, Los Angeles, Calif., a corporation of California
Filed May 26, 1959, Ser. No. 815,839
8 Claims. (Cl. 4—187)

This invention relates to food waste removal apparatus for use in conjunction with a garbage grinder or the like.

It is an object of the invention to provide waste removal apparatus which will permit a maximum waste feed speed and maximum protection against foreign objects for a particular food scrapping operation. A further object of the invention is to provide such apparatus which is adaptable to various types of waste material, rates of feed, and operator's skills. A further object is to provide waste removal apparatus that will have access space for large wastes while providing adequate arrangements for trapping tableware and similar foreign objects.

It is an object of the invention to provide food waste removal apparatus which permits one hand scrapping of dishes, i.e., apparatus providing for dumping, scraping and rinsing of a dinner plate in a single operation requiring only one hand of the operator. Another object is to provide such apparatus having a dish scraping flange positioned within the sink permitting dumping and scraping in a single operation. A further object is to provide such further apparatus wherein the flange is carried on a cap positioned above the outlet opening of the sink and a water spray is directed downward onto the cap for rinsing a scraped dish.

It is an object to provide food waste removal apparatus having a scraping flange positioned above the outlet of the sink with a sleeve projecting above the outlet to provide a tableware trapping space in the sink. A further object is to provide such apparatus wherein the sleeve has an opening in the side thereof for receiving waste material.

It is an object to provide food waste removal apparatus having a source carried on the sink producing a spiraling stream of water in the sink for moving waste into the outlet opening. A further object is to provide such apparatus having a second source which may be varied to direct water downward onto the cap or in a spiraling stream around the sink either aiding or opposing the first spiraling stream. Another object is to provide such apparatus wherein the opposing streams meet and form a cascade which is directed into the outlet opening for moving large amounts of waste.

It is an object of the invention to provide food waste removal apparatus having a plurality of multiple purpose, interchangeable parts which can be arranged to accomplish the aforesaid objects in the most efficient manner while maintaining maximum protection.

The invention also comprises novel details of construction and novel combinations and arrangements of parts, which more fully appear in the course of the following description. The drawings merely show and the description merely describes a preferred embodiment of the present invention which is given by way of illustration or example.

In the drawings:

FIG. 5 is an enlarged partial sectional view similar to that of FIG. 2 showing a different sleeve in the outlet opening;

FIG. 6 is an enlarged view showing a detail of FIG. 5;

FIG. 7 is a view of a portion of FIG. 5 with a scraper ring in position on the sleeve;

FIG. 8 is a view of a portion of FIG. 5 with a scraper cap in position on the sleeve; and FIG. 9 is an exploded view of the apparatus of the invention.

Figure 1:
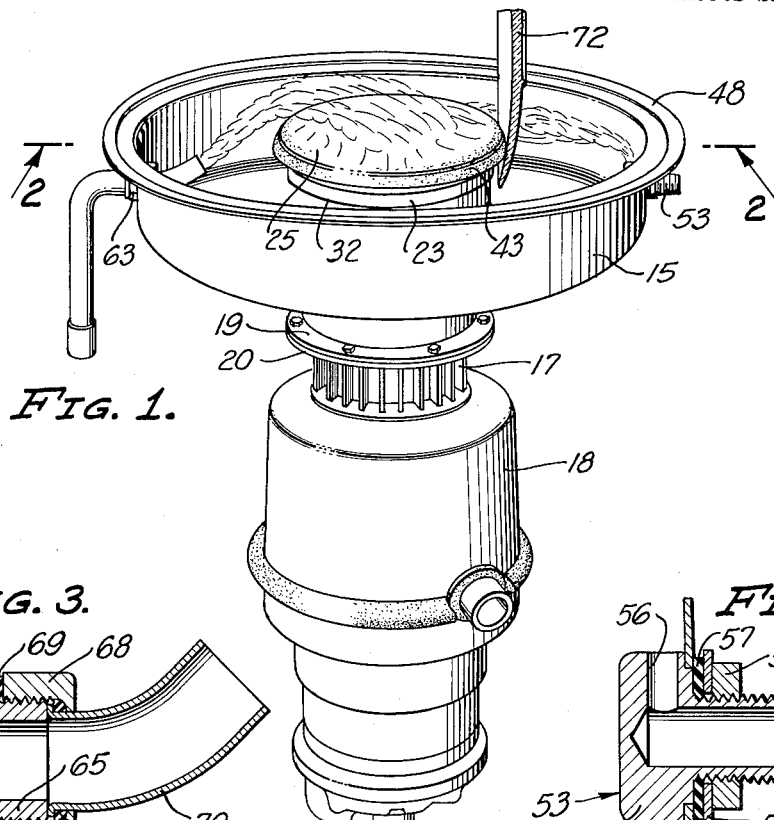
FIG. 1 is a perspective view of a preferred form of the invention.

The apparatus of the invention includes a sink 15 having an outlet opening 16 at which a mounting flange 17 of a conventional garbage grinder 18 is fastened by coupling rings 19, 20.

Figure 2:
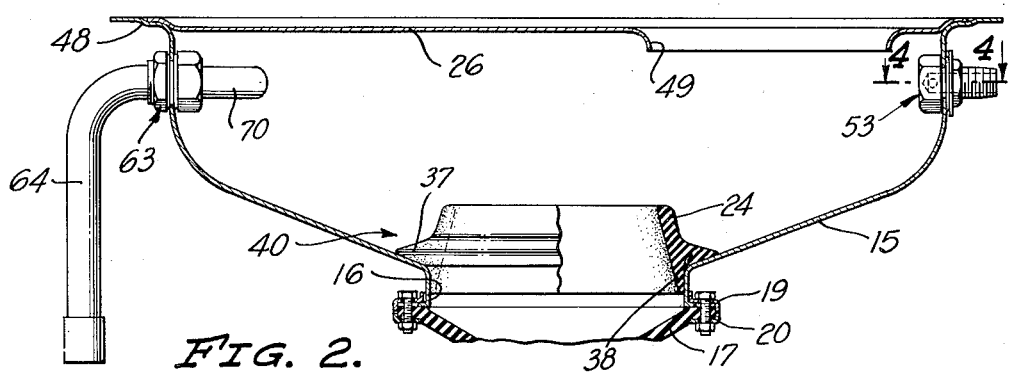
FIG. 2 is an enlarged partial sectional view taken along the line 2—2 of FIG. 1, showing an alternative arrangement of the invention.

The apparatus also includes a sleeve 23 which may be positioned in the outlet opening of the sink as shown in FIG. 5, a ring 24 which may be mounted on the sleeve as shown in FIG. 7 or positioned in the outlet opening as shown in FIG. 2, a cap 25 which may be mounted on the sleeve as shown in FIG. 8 or positioned in the ring as shown in FIG. 9, and a cover plate 26 which may rest on the sink as shown in FIGS. 2 and 5.

The sleeve 23 is tubular in form and is a sliding fit in the outlet opening 16. A plurality of outwardly directed dimples 30 are provided in the sleeve adjacent the lower end for engaging the sink wall and limiting movement of the sleeve into the outlet opening. A plurality of tongues 31, best seen in FIG. 6, are provided in the lower edge of the sleeve and are sprung outward to provide a gripping engagement with the outlet opening. The sleeve 23 is of a height to project near the top of the sink, providing a convenient height for the scrapping operations to be described. A relatively large opening 32 is provided in the wall of the sleeve 23 with the lower edge 33 of the opening disposed above the wall of the sink, providing a space indicated at 34 in which heavy objects such as tableware may collect.

The ring 24 is preferably made of a resilient material such as rubber or the like. The ring has a radially extending rim or flange 37, an axially projecting flange 38 and an annular groove 39 (FIG. 7). The ring may be mounted on the upper end of the sleeve 23 with the rim of the sleeve positioned in the groove 39 as shown in FIG. 7. Alternatively, the ring may be mounted directly in the sink with the flange 38 projecting into the outlet opening 16 and the rim 37 engaging the wall of the sink. When the ring is inserted directly in the sink in this manner, as shown in FIG. 2, it functions as a sleeve providing a tableware trapping space indicated generally at 40.

The cap 25 is preferably made of a resilient material such as rubber or the like and has a radially projecting rim or flange 43, an axially projecting section 44 and an annular groove 45 (FIG. 8) and may be mounted on the sleeve 23 with the upper end of the sleeve positioned in the groove 45 as shown in FIGS. 1 and 8.

The cover plate 26 rests on a flange 48 of the sink as shown in FIG. 2, the cover plate being removable and replaceable at will. An opening 49 is provided in the cover plate, this opening being of the same order of magnitude as the opening 32 in the sleeve 23 and being displaced laterally from the center of the plate.

A nozzle 53 is mounted on the wall of the sink 15 for directing a spiral stream of water around the sink. The nozzle is shown in detail in FIG. 4 and includes a plug 54 having an axial opening 55 communicating with a lateral opening 56. The plug is mounted on the sink with a gasket 57, a washer 58 and a nut 59, the external threads 60 also providing for connecting a water line to the nozzle.

Figures 3, 4:
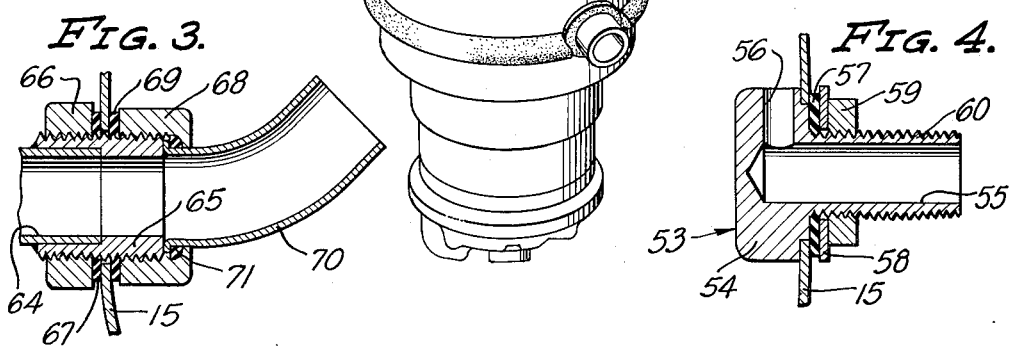
FIG. 3 is an enlarged sectional view of the variable nozzle of FIG. 2.
FIG. 4 is an enlarged sectional view taken along the line 4—4 of FIG. 2.

Another nozzle 63 is mounted in the wall of the sink opposite the nozzle 53, this unit being shown in detail in FIG. 3. The nozzle includes an inlet pipe 64 having a threaded nipple 65 fixed thereto, the nipple projecting into the sink through an opening in the wall thereof. The nipple is fixed in place by an external nut 66 and gasket 67 and an internal nut 68 and gasket 69. An outlet pipe 70 is clamped against the nipple by the nut 68 and a seal ring 71, the outlet pipe being rotatable for varying the direction of the water stream.

In FIG. 1, a preferred configuration of the apparatus of the invention is illustrated, which configuration permits one hand scrapping of dishes and the like. In this configuration, the sleeve 23 is mounted in the outlet openings of the sink and the cap 25 is mounted on the sleeve. A source of water is connected to the nozzle 53 for directing a counterclockwise spiraling stream of water into the sink. Another water source is connected to the nozzle 63 and the outlet pipe 70 is adjusted to produce a stream of water which arcs upward and then impinges in a downward direction on top of the cap 25. The sleeve 23 is preferably oriented so that the opening 32 faces toward the nozzle 63. Thus, while the stream of water from the nozzle 63 produces a flowing sheet of water over the cap 25, the major portion of the water will flow over the edge of the cap on a side remote from the opening 32.

In using the apparatus, a plate 72 is grasped in one hand by the operator and the contents dumped into the sink, ordinarily by striking an edge of the plate on the upper surface of the cap to dislodge the waste material on the plate. Material which continues to adhere to the plate is scraped therefrom by moving the plate in an upward direction while engaging the flange 43 as shown in FIG. 1. The plate may then be moved in a horizontal direction under the stream of water from the nozzle 63 to rinse the plate. Thus, it is seen that the configuration permits dumping scraping and rinsing of a plate with one hand in a single operation. The stream of water from the nozzle 63 continually flushes the waste material from the top of the cap and the stream from the nozzle 53 serves to wash the waste through the opening 32 of the sleeve and into the outlet opening of the sink while the space 34 between the edge 33 of the sleeve and the sink wall serves as a trap for foreign objects such as tableware and the like. This configuration provides a very high waste feeding speed while maintaining protection against foreign objects.

An even higher waste feeding rate can be achieved by substituting the ring 24 for the cap 25 with the major portion of the waste material being dumped directly through the ring and sleeve into the outlet opening. It should be noted that this configuration requires greater skill on the part of the operator in preventing foreign objects from being dropped directly through the ring.

The configuration of FIG. 5 provides for handling large wastes while maintaining adequate protection under operating conditions where the likelihood of encountering foreign objects is relatively great. The sleeve 23 is mounted in the outlet opening and the cover plate 26 is placed over the sink, preferably with the opening 49 of the cover plate oriented away from the opening 32 in the sleeve. A swirling stream of water is produced in the sink by the nozzle 53 and the outlet pipe 70 of the nozzle 63 may be turned to a horizontal position to provide an additional swirling stream aiding the first stream. Waste material is dumped through the opening 49, is swirled around in the sink and flushed out the opening 32, and space 34 serving as a tableware trap.

A higher speed operation may be achieved by using the configuration of FIG. 2, wherein the ring 24 is substituted for the sleeve 23. Where heavy wastes are being handled, the nozzle 63 may be arranged as shown in FIG. 9 so that the stream of water from it will be counter to the stream from the nozzle 53. The meeting streams will form a cascade toward the center of the sink and tend to flush the heavier wastes over the lip of the tableware trap and into the outlet opening. Thus it is seen that the food waste removal apparatus of the invention is adapted to handle various types of wastes under different operating conditions. The elements of the apparatus may be arranged variously to achieve the optimum operating speed and safety. Also, the apparatus permits changing of its configuration from a maximum safety condition to a minimum safety condition for a given type of operation as the skill of the operator improves. The single apparatus may be used for scrapping of dishes prior to washing, as a disposal during vegetable preparation, or for grinding of previously collected waste material by suitably arranging the appropriate elements of the apparatus as described above.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In combination: a substantially circular sink having an outlet opening; a sleeve positioned in said outlet opening and projecting coaxially above said outlet opening, said sleeve having an opening in the wall thereof for access from said sink to said outlet opening, with the lower edge of said sleeve opening above the adjacent surface of said sink for trapping tableware in said sink; a cap of resilient material carried on the upper end of said sleeve, said cap having a peripheral flange projecting radially outward of said sleeve over said sink; a first water source mounted in the wall of said sink below the upper edge thereof for directing a spray of water in an upward arc to impinge downwardly on said cap for covering said cap with a layer of flowing water; and a second water source mounted in the wall of said sink below the upper edge thereof, said second source including means for directing a spiraling stream of water into said sink, said first source including means for varying the spray from said upward arc position to direct another spiraling stream into said sink for aiding and opposing the one spiraling stream.

2. In combination: a generally circular sink having a central outlet opening; an upright sleeve mounted on said sink over said outlet opening, said sleeve having an opening in the side wall thereof of a size to pass tableware with the lower edge of said sleeve opening above the adjacent surface of said sink to serve as a barrier to keep pieces of tableware from sliding into said outlet opening; a first water source mounted on the wall of said sink below the upper edge thereof, said first source including means for directing a first stream of water into said sink in a circular path along the wall thereof in one direction; and a second water source mounted on the wall of said sink below the upper edge thereof and spaced from said first source, said second source including means for directing a second stream of water into said sink in a circular path along the wall thereof in the opposite direction to meet said first stream producing a cascade, with said sleeve being rotatable relative to said sink for positioning said sleeve opening to receive said cascade.

3. In combination: a generally conical sink having a central outlet opening; a cover plate resting on said sink, said cover plate having an opening therethrough of the same order of magnitude as said outlet opening with said plate opening displaced laterally relative to said outlet opening; a sleeve positioned in said outlet opening and projecting upward from the adjacent surface of said sink for trapping tableware in said sink; and means mounted on said sink for directing a spiraling stream of water into said sink.

4. In combination: a generally conical sink having a central outlet opening; a cover plate resting on said sink, said cover plate having an opening therethrough of the same order of magnitude as said outlet opening with said plate opening displaced laterally relative to said outlet opening; a sleeve positioned in said outlet opening and projecting upward therefrom with the upper end of said sleeve adjacent said cover plate, said sleeve having an opening in the side wall thereof with the lower edge of said sleeve opening above the adjacent surface of said sink for trapping tableware in said sink, said sleeve and cover plate being positionable with said sleeve opening directed away from said plate opening; and means mounted on said sink for directing a spiraling stream of water into said sink.

5. In a food waste removal apparatus adapted for one hand scraping of dishes, the combination of: a sink having an upper edge and an outlet opening at the bottom of the sink; a cap of resilient material having a relatively flat top surface and a peripheral flange terminating in a scraping edge; and means for supporting said cap in said sink above said outlet opening with said top surface substantially on the level of said sink edge.

6. In a food waste removal apparatus adapted for one hand scraping of dishes, the combination of: a sink having an upper edge and an outlet opening at the bottom of the sink; a cap of resilient material having a relatively flat top surface and a peripheral flange terminating in a scraping edge; means for supporting said cap in said sink above said oulet opening with said top surface adjacent the level of said sink edge; and a continuously running water source mounted in the wall of said sink below said upper edge, said source including means for directing a spray of water in an upward arc to impinge downwardly on said cap for covering said cap with a layer of flowing water.

7. In combination: a sink having an outlet opening; a sleeve positioned in said outlet opening and projecting coaxially thereabove providing unrestricted flow from said sleeve through said outlet opening, said sleeve having a closed wall with a single opening therein, with the lower edge of said sleeve opening located above the adjacent surface of said sink for trapping tableware in said sink; a cap carried on the upper end of said sleeve, said cap having a peripheral flange of resilient material projecting radially outward of said sleeve over said sink; and a water source mounted in the wall of said sink below the upper edge thereof, said source including means for directing a continuous spray of water in an upward arc to impinge downwardly on said cap.

8. In combination: a sink having an outlet opening; a sleeve positioned in said outlet opening and projecting coaxially above said outlet opening, said sleeve having a closed wall with an opening therein for access from said sink to said outlet opening, with the lower edge of said sleeve opening above the adjacent surface of said sink for trapping tableware in said sink; a closed cap of resilient material carried on the upper end of said sleeve, said cap having a peripheral flange projecting radially outward of said sleeve over said sink at substantially the level of the upper edge of said sink; and a water source mounted in the wall of said sink below the upper edge thereof, said source including means for directing a continuous spray of water in an upward arc to impinge downwardly on said cap for covering said cap with a layer of flowing water, with said sleeve oriented to position the closed wall toward said source and the opening away from said source preventing direct flow from said source to said outlet opening.

References Cited in the file of this patent
UNITED STATES PATENTS

| | | |
|---|---|---|
| 1,468,565 | Guth | Sept. 18, 1923 |
| 2,374,642 | Bloch | May 1, 1945 |
| 2,581,047 | Salmond et al. | Jan. 1, 1952 |
| 2,615,636 | Powers | Oct. 28, 1952 |
| 2,701,644 | Griffiths | Feb. 8, 1955 |
| 2,709,046 | Hyde | May 24, 1955 |
| 2,753,571 | Draper | July 10, 1956 |
| 2,761,626 | Gustaveson | Sept. 4, 1956 |
| 2,768,387 | Draper et al. | Oct. 30, 1956 |
| 2,829,379 | McGee | Apr. 8, 1958 |
| 2,886,262 | Fletcher | May 12, 1959 |
| 2,902,700 | Chambers | Sept. 8, 1959 |

FOREIGN PATENTS

| | | |
|---|---|---|
| 779,757 | France | Jan. 19, 1935 |